United States Patent
Potharaju et al.

(10) Patent No.: US 11,304,109 B1
(45) Date of Patent: Apr. 12, 2022

(54) TECHNIQUES TO PREVENT AND/OR MINIMIZE USER EQUIPMENT SERVICE DISRUPTIONS IN VIRTUALIZED RADIO ACCESS NETWORK ARCHITECTURES

(71) Applicant: Cisco Technology, Inc., San Jose, CA (US)

(72) Inventors: Shailender Potharaju, Fremont, CA (US); Indermeet Singh Gandhi, San Jose, CA (US); Mark Grayson, Berkshire (GB)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 17/094,163

(22) Filed: Nov. 10, 2020

(51) Int. Cl.
| | |
|---|---|
| *H04W 36/00* | (2009.01) |
| *H04W 36/22* | (2009.01) |
| *H04B 17/318* | (2015.01) |
| *H04W 76/15* | (2018.01) |
| *H04W 8/24* | (2009.01) |

(52) U.S. Cl.
CPC .......... *H04W 36/22* (2013.01); *H04B 17/318* (2015.01); *H04W 8/24* (2013.01); *H04W 36/0058* (2018.08); *H04W 36/0069* (2018.08); *H04W 36/00837* (2018.08); *H04W 76/15* (2018.02)

(58) Field of Classification Search
CPC ............. H04W 36/22; H04W 36/0069; H04W 36/00837; H04W 36/0058; H04W 76/15; H04W 8/24; H04W 36/28; H04B 17/318
See application file for complete search history.

(56) References Cited

U.S. PATENT DOCUMENTS

| | | | | |
|---|---|---|---|---|
| 2008/0057970 | A1* | 3/2008 | Takada | H04W 36/18 455/450 |
| 2013/0324107 | A1* | 12/2013 | Lindoff | H04W 24/10 455/422.1 |

(Continued)

OTHER PUBLICATIONS

3GPP, "3rd Generation Partnership Project; Technical Specification Group Radio Access Network; NG-RAN F1 application protocol (F1AP) (Release 16)", 3GPP TS 38.473 V16.2.0, Jul. 2020, 363 pages.

(Continued)

*Primary Examiner* — Quoc Thai N Vu
(74) *Attorney, Agent, or Firm* — Edell, Shapiro & Finnan, LLC

(57) ABSTRACT

Presented herein are techniques to prevent and/or minimize user equipment (UE) service disruptions in a virtualized Radio Access Network (vRAN) architecture. In one example, a method may include establishing, via a central unit of a vRAN, a first radio connection for a UE via a first cell belonging to a first shared cell for the vRAN; determining that the UE is dual connectivity capable; instructing the UE to perform measurements for one or more other cells belonging to one or more other shared cells that have available capacity; obtaining measurement information from the UE for the one or more other cells; determining, based on the measurement information, a second cell among the one or more other cells having a highest measured signal strength; and establishing a second radio connection for the UE via the second cell belonging to the second shared cell.

20 Claims, 6 Drawing Sheets

(56) References Cited

U.S. PATENT DOCUMENTS

| | | |
|---|---|---|
| 2018/0368204 A1 | 12/2018 | Park et al. |
| 2020/0045583 A1 | 2/2020 | Kim et al. |
| 2020/0120559 A1 | 4/2020 | Centonza et al. |
| 2020/0120732 A1 | 4/2020 | Teyeb et al. |
| 2020/0204252 A1 | 6/2020 | Barbieri et al. |
| 2020/0260324 A1 | 8/2020 | Byun et al. |

OTHER PUBLICATIONS

3GPP, "3rd Generation Partnership Project; Technical Specification Group Radio Access Network; NG-RAN Architecture description (Release 16)", 3GPP TS 38.401 V16.3.0, Sep. 2020, 78 pages.

* cited by examiner

TECHNIQUES TO PREVENT AND/OR MINIMIZE USER EQUIPMENT SERVICE DISRUPTIONS IN VIRTUALIZED RADIO ACCESS NETWORK ARCHITECTURES

TECHNICAL FIELD

The present disclosure relates to network equipment and services.

BACKGROUND

Networking architectures have grown increasingly complex in communications environments, particularly mobile networking environments. In particular, virtualized Radio Access Network (vRAN) architectures have been developed to provide radio coverage for mobile networks. However, there are significant challenges in managing user equipment (UE) service for vRAN architectures.

DESCRIPTION OF EXAMPLE EMBODIMENTS

Overview

Figure 1:
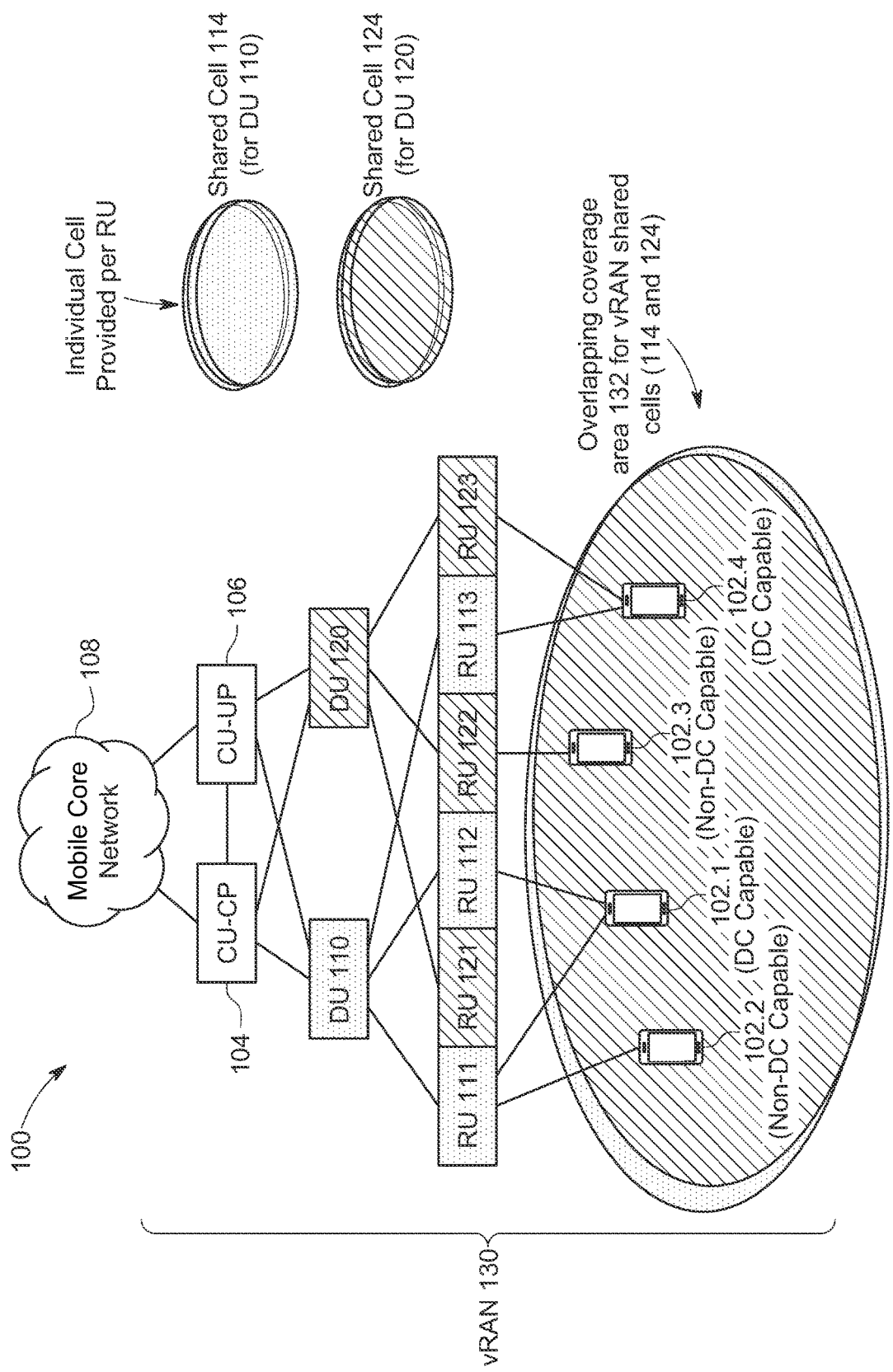
FIG. 1 is a diagram of a system in which techniques may be implemented to prevent and/or minimize user equipment (UE) service disruptions in a virtualized Radio Access Network (vRAN) architecture, according to an example embodiment.

Techniques presented herein may provide for the ability to prevent and/or minimize user equipment (UE) service disruptions in disaggregated virtualized Radio Access Network (vRAN) architectures. In particular, techniques herein may enable optimized handling for UE dual connectivity sessions in a manner that minimizes service disruptions for UEs when radio access cells become overloaded and/or when a failure occurs within a vRAN.

In one embodiment, a method is provided that may include establishing, via a central unit of a vRAN, a first radio connection for a UE via a first cell belonging to a first shared cell for the vRAN, wherein the first shared cell is served by a plurality of first radio units and a first distributed unit; determining that the UE is dual connectivity capable; instructing the UE to perform measurements for one or more other cells belonging to one or more other shared cells that have available capacity; obtaining measurement information from the UE for the one or more other cells; determining, based on the measurement information, a second cell among the one or more other cells having a highest measured signal strength, wherein the second cell belongs to a second shared cell served by a plurality of second radio units and a second distributed unit that is different than the first distributed unit; and establishing a second radio connection for the UE via the second cell belonging to the second shared cell, wherein the first radio connection and the second radio connection are provided concurrently for the UE.

Example Embodiments

As referred to herein, an 'enterprise' or 'enterprise entity' may be considered to be a business, government, educational institution, an organization, and/or the like that may include multiple enterprise locations (or sites), such as a main campus, remote branches, and so on. Enterprise devices (e.g., enterprise user equipment (UE), etc.) that may be owned, operated, and/or otherwise associated with an enterprise may be utilized by enterprise users to serve enterprise purposes (e.g., business purpose, government purpose, educational/university purpose, etc.) of the enterprise. In some instances, an enterprise may operate an enterprise network, also referred to as an enterprise data network, which may be a network implemented to serve enterprise purposes (e.g., host enterprise applications/services/etc., perform authentications and/or authorizations, etc. for enterprise users associated with one or more UE, and/or the like).

Further as referred to herein, a wireless wide area (WWA) access network, such as a cellular/Third (3rd) Generation Partnership Project (3GPP) access networks, may be characterized as a Radio Access Network (RAN) having radio nodes such as evolved Node Bs (eNBs or eNodeBs) for Fourth (4th) Generation (4G)/Long Term Evolution (LTE) access networks, next generation Node Bs (gNBs or gNodeBs) for Fifth (5th) Generation (5G) and/or next Generation (nG) access networks, and/or the like that provide a larger RAN coverage area as compared to the RAN coverages area typically provided by wireless local area (WLA) radio nodes (e.g., Institute of Electrical and Electronics Engineers (IEEE) 802.11 access points, Wi-Fi® access points, Wi-Fi6® access points, etc.). Stated differently, the WWA RAN coverage area provided by a WWA radio node is typically larger (sometimes orders of magnitude larger) than the WLA RAN coverage area provided by a WLA radio node. Additionally, a WWA RAN radio node can typically provide radio access connectivity for a larger number of devices as compared to a WLA RAN radio node. Depending on implementation, any combination of WWA and/or WLA RANs may be utilized to facilitate connections between one or more devices and any combination of Local Area Networks (LANs), such as an enterprise network for an enterprise location; Wide Area Networks (WANs), such as the Internet, multiple enterprise networks spread across multiple locations; Software Defined WAN (SD-WAN); and/or any other network architecture/environment.

In some instances, an access network, such as a WWA access network, may be referred to as a private access network. By 'private' it is meant that a private WWA access network (e.g., a Citizen Broadband Radio Service (CBRS) access network and/or a 3GPP cellular (4G/LTE, 5G, nG, etc.) access network) may provide network connectivity/services to clients (e.g., users/user equipment/devices/etc.) served by a network operator and/or service provider of the private WWA access network, such as an enterprise. In one example, a private WWA access network may be considered to be a network that may be implemented to serve enterprise purposes (e.g., business purposes, government purposes, educational purposes, etc.) for enterprise clients (e.g., enterprise users/user equipment/devices/etc.) in which the private WWA access network may be operated by any combination of traditional public mobile network operators/service providers (e.g., AT&T®, etc.), enterprises network operators/ service providers (e.g., Cisco®, etc.), and/or third party network operators/service providers (e.g., neutral host network operators/service providers, cloud service providers, etc.). A private network may also be referred to as a non-public network (NPN) in some instances. Cisco is a registered trademark of Cisco Technology, Inc. AT&T is a registered trademark of AT&T Intellectual Property.

Discussed herein are features associated with vRAN architectures that may be provided for WWA accesses. In some instances, a vRAN architecture can be implemented as a disaggregated vRAN architecture that includes the split of a base station, such as a gNB, into a Central (or Centralized) Unit (CU), one or several Distributed Units (DUs), and one or several Radio Units (RUs). Further disaggregation may include separation of the CU into a Central Unit Control Plane (CU-CP) component and a Central Unit User Plane (CU-UP) component. In some instances, certain vRAN components may also be referred to as virtualized components (e.g., virtualized DU (vDU) components, and/or virtualized CU (vCU) components). For a vRAN architecture, one or more RU(s) can interface with a DU component, which further interfaces with a CU-CP component and a CU-UP component. In some instances, such as for shared cell vRAN architectures as discussed in further detail herein, multiple DUs (each interfacing with corresponding RU(s)) can interface with a CU-CP component and a CU-UP component.

Referring to FIG. 1, FIG. 1 is a block diagram of a system 100 in which techniques may be implemented to prevent and/or minimize UE service disruptions in a vRAN architecture, according to an example embodiment. System 100 includes a number of user equipment (UE) 102.1, 102.2, 102.3, and 102.4, a mobile core network 108, and a vRAN 130, which may be a disaggregated vRAN 130 including a CU-CP component 104 (also referred to as CU-CP 104), a CU-UP component 106 (also referred to as CU-UP 106), a first DU component 110 (also referred to as first DU 110), a second DU component 120 (also referred to as second DU 120), a number of first RUs 111, 112, and 113 interfacing with/served by the first DU 110, and a number of second RUs 121, 122, and 123 interfacing with/served by the second DU 120.

Generally, vRAN 130, may be configured to provide 3GPP private 4G/LTE, 5G/nG, and/or CBRS mobile network services via first RUs 111-113 and second RUs 121-123, which may provide an overlapping coverage area 132 as shown in FIG. 1, which is discussed in further detail below.

An RU, such as any of first RUs 111-113 and second RUs 121-123, may terminate any combination of a WWA (e.g., cellular) and/or WLA (e.g., Wi-Fi®) air interface for any combination of Radio Access Technology (RAT) types (sometimes referred to more generally as 'accesses') for vRAN 130 such as, but not limited to: 3GPP licensed spectrum accesses (e.g., 3rd Generation (3G), 4G/LTE, 5G, and/or next Generation (nG) accesses); 3GPP unlicensed spectrum accesses (e.g., Licensed-Assisted Access (LAA), enhanced LAA (eLAA), further enhanced LAA (feLAA), and New Radio Unlicensed (NR-U)); non-3GPP unlicensed spectrum accesses such as Institute of Electrical and Electronics Engineers (IEEE) 802.11 (e.g., Wi-Fi®); IEEE 802.16 (e.g., WiMAX®), Near Field Communications (NFC), Bluetooth®, and/or the like; Citizens Broadband Radio Service (CBRS) accesses; combinations thereof; and/or the like.

Thus, an RU may be inclusive of any configuration/combination of 3GPP 4G/LTE evolved Node Bs (eNBs or eNodeBs), 5G next Generation Node Bs (gNBs or gNodeBs), and/or any other next Generation access nodes that may include hardware and/or software to perform baseband signal processing (such as modulation/demodulation) as well as hardware (e.g., baseband processors (modems), transmitters and receivers, transceivers, and/or the like), software, logic and/or the like to facilitate signal transmissions and signal receptions via antenna assemblies (not shown) in order to provide over-the-air Radio Frequency (RF) coverage for one or more access types (e.g., 4G/LTE, 5G, nG, CBRS, etc.) through which one or more UE, such as any of UE 102.1-102.4, may utilize to connect to one or more RUs for one or more sessions (e.g., voice, video, data, gaming, combinations thereof, etc.). More generally, an RU may perform lower Physical (PHY) layer and RF operations to facilitate RF connections with one or more UE. The coverage area of a radio node such as an eNB, gNB, RU, etc. is typically referred to as a 'cell' in which one or more UE may attach to the radio node that serves the coverage area/cell.

A DU (also sometimes referred to as a baseband unit) may provide lower level operations of the radio signal processing stack, such as Radio Link Control (RLC), Medium Access Control (MAC), and higher PHY layer operations, such as digital processing, including signal modulation, encoding, and scheduling, among others. A CU-UP may provide upper level operations of a radio signal processing stack, such as user plane Packet Data Convergence Protocol (PDCP) functions and user plane Service Data Adaptation Protocol (SDAP), among others. The split of operations of a radio signal processing stack among between a DU a CU-UP can be varied depending on implementation and/or configuration of a given vRAN/network architecture. In addition to radio signal processing operations, first DU 110, second DU 120, and CU-UP 106 may perform additional operations as discussed for various embodiments herein. Further, in addition to operations discussed for embodiments herein, a CU-CP, such as CU-CP 104, generally operates to control DU(s) and CU-UP for a vRAN architecture, such as vRAN 130, via Radio Resource Control (RRC) functions and the control plane part of the PDCP protocol.

A UE, such as any of UE 102.1-102.4, may be associated with any user, subscriber, employee, client, customer, electronic device, etc. wishing to initiate a flow in system 100 and may be inclusive of any device that initiates a communication in system 100, such as a computer, an electronic device such as an industrial device, automation device, enterprise device, appliance, Internet of Things (IoT) device, etc., a laptop or electronic notebook, a WWA/WLA (cellular/Wi-Fi®) enabled telephone/smart phone, tablet, etc. and/or any other device, component, element, or object capable of initiating voice, audio, video, media, or data exchanges within system 100. It is to be understood that UEs discussed herein may also be configured with any combination of hardware (e.g., communications units, receiver(s), transmitter(s), transceiver(s), antenna(s) and/or antenna array(s), processor(s), memory element(s), baseband processor(s) (modems), etc.)], controllers, software, logic, and/or any other elements/entities that may facilitate over-the-air RF connections with one or more access networks.

In some instances, a UE may be a dual connectivity (DC) capable UE such that the UE may be capable of two concurrent connections to a same RAT type (e.g. a primary connection and a secondary connection). As shown in FIG. 1, UE 102.1 and UE 102.4 are considered to be DC capable UEs, while UE 102.2 and UE 102.3 may be considered non-DC capable UEs. During connection establishment of a UE for a given cell, the UE may indicate its DC or non-DC capability As shown in FIG. 1, each of first RUs 111, 112, and 113 may provide per-RU first cells (e.g., per-RU coverage areas) that define a first shared cell 114. Each first RU 111-113 interfaces with first DU 110 for the first shared cell 114. Each of second RUs 121, 122, and 123 may provide per-RU second cells that define a second shared cell 124. Each second RU 121, 122, and 124 interfaces with second DU for the second shared cell. Each of first DU 110 and second DU 120 further interface with CU-CP 104 via a corresponding F1-C interface and CU-UP 106 via a corresponding F1-U. Each of CU-CP 104 and CU-UP 106 further interface with each other via an E1 interface and with mobile core network 108. Mobile core network 108 may be configured as any combination of a (private or non-private) 4G/LTE core, typically referred to as the Evolved Packet Core or System (EPC/EPS), 5G core or system (5GC/5GS), next Generation (nG) core or system (e.g., a Sixth Generation (6G) core/system, etc.), and/or the like as may be defined by 3GPP or other similar standards and may include any components, network elements, etc. in order to facilitate operations discussed herein. For example, in one instance for a 5G/nG mobile network core, the CU-CP 104 may interface with a 3GPP Access and Mobility Management Function (AMF) within the core and the CU-UP 106 may interface with one or more 3GPP User Plane Functions (UPFs) within the core.

In a shared cell deployment, such as shown for the disaggregated vRAN 130 of FIG. 1, each DU (with all of its RUs) acts like a single cell to serve one or more UEs. When a UE connects to an RU that is part of a shared cell, the UE remains as part of the shared cell even as it may move across the coverage area served by multiple RUs belonging to the shared cell. The illustration for the overlapping coverage area 132 of the first shared cell 114 and the second shared cell 124 illustrates one coverage area per each shared cell for illustrative purposes only. It is to be understood that per-RU cells/coverage areas (which may be partially or wholly overlapping) are present for the overlapping coverage area 132 for each first RU 111, 112, and 113 that define the first shared cell 114 that is served by each first RU 111-113 and DU 110 and are present for each second RU 121, 122, and 123 that define the second shared cell 124 that is served by each second RU 121-123 and DU 120. In some instances, a shared cell may also be referred to as a 'super cell'. Per embodiments herein, an RU may support one or multiple shared cells.

Although only two shared cells are illustrated in FIG. 1, it is to be understood that any number of shared cells may be present in a disaggregated vRAN/shared cell architecture in accordance with embodiments herein. Further, it is to be understood that each shared cell may be served by any number of two or more RUs.

Disaggregated vRAN and shared cell architectures are new concepts that are being considered for enterprise (e.g., private) deployments in order to provide solutions for various coverage and capacity use-cases. Although current shared cell architectures providing improved coverage and capacity through overlapping coverage areas alone may appear to solve issues related to DU and RU failures, there are at least 2 issues with this architecture.

First, under a shared cell architecture, when each dual connectivity (DC) capable UE is connected initially to a shared cell, it may remain part of that cell. As noted above, when a UE connects to an RU that is part of a shared cell, the UE remains as part of the shared cell even as it may move across the coverage area served by multiple RUs belonging to the shared cell. This may result in one shared cell becoming overcrowded compared to the other shared cell(s) in the overlapping coverage area as there are no inter-cell handovers. As a result, there may be cases in which one of the cells gets overloaded compared to other cells and remains that way throughout UE sessions. This may result in one DU becoming over-provisioned while another DU is underutilized.

Second, a UE having dual connectivity capability may be connected on both links on a same DU hosting multiple cells for a same shared cell (e.g., UE 102.1 as shown in FIG. 1 being connected on both links to first RUs 111 and 112 for the first shared cell 114 served by the same DU 110). This may result despite the having dual connectivity support. Such a scenario may result in a temporary service disruption when a DU (potentially an overloaded DU) at which both links are anchored crashes or otherwise fails. In such a case, the DU failure will result in all UEs having sessions served by the DU losing connectivity and all UEs performing another cell-reselection to regain connectivity, which could take up to 12 seconds; thereby impacting user experience. Further regaining connectivity for the UEs can affect not only the vRAN, but can also affect signaling/communications with the mobile core network as all the UEs perform the cell-reselection.

Thus, what is needed is an optimized technique for new and dual connectivity sessions to be handled in a manner that minimizes and/or prevents service disruption for the UEs.

In accordance with techniques discussed herein, system 100 may provide for the ability to prevent and/or minimize UE service disruptions in the vRAN 130. During operation in at least one embodiment, in order to solve such issues and/or perform load-balancing across different DUs (e.g., first DU 110 and second DU 120) during UE initial connection, as DC capable UEs perform cell-selection and join a shared cell/DU, the CU-CP 104 may monitor connections across DUs other than the DU at which the primary connection is established in order to determine a shared cell/DU having available capacity that may be a candidate at which to establish a secondary connection for a given UE. Thus, through techniques discussed herein the CU-CP 104 may provide for the ability to anchor dual connectivity links for one or more UEs over different shared cells/DUs.

For example, consider that UE 102.4 as shown in FIG. 1 is a DC capable UE in which primary and secondary shared cell connections are established in accordance with the techniques herein across two different shared cells: first shared cell 114 served by first DU 110/first RUs 111-113 and second shared cell 124 served by second DU 120/second RUs 121-123.

In addition to initial primary and secondary connection establishment for a DC capable UE across different shared cells/DUs for a given overlapping coverage area, in one instance, load balancing/re-balancing may also be performed by the CU-CP 104 and CU-UP 106 in accordance with techniques of the present disclosure. For example, as the load on one DU increases above a watermark threshold level, the CU-CP 104 may start performing inter-DU handover from one overlapping shared cell served by one DU to another overlapping shared cell served by a different DU to facilitate load re-balancing among multiple shared cells/DUs. The CU-CP 104 may determine/prepare a target shared cell/DU for handovers to perform such load re-balancing based on various capacity related information or parameters obtained from DUs serving shared cells in which the capacity information or parameters may include but not be limited to, per-RU/cell level and/or DU level session information (e.g., number sessions currently supported by RUs and/or the DU for a shared cell, etc.); bandwidth information (e.g., bandwidth utilization, such as available and used bandwidth); shared cell load (e.g., percentage of full load handled by a DU, an overload indicator, etc.); supported frequency on a UE for cell-reselection; density, distribution, and/or coverage area of RUs served by a DU for a shared cell; combinations thereof; and/or the like. In one example involving frequency for cell-reselection, consider that there may be four shared cells of frequencies: Freq1, Freq2, Freq3, and Freq4, which are the supported frequencies. Load balancing can be utilized to determine the best cell to offload a UE and provide the frequency information to the UE for cell-reselection.

In one instance for performing inter-DU handover, the CU-CP 104 may select UEs that do not have any or do not have a large amount of traffic pending (uplink (UL) or downlink (DL)) leveraging user plane buffer status information obtained from a DU (for UL and/or DL buffer status information) and/or the CU-UP 106 (for DL buffer status information). The CU-CP 104 may iterate over this process multiple times in order to bring multiple shared cells to an approximate equilibrium (e.g., such that roughly the same number of sessions are handled across multiple shared cells for a given coverage area). In one instance, a threshold level or range of pending traffic can be used to determine whether to perform a shared cell handover for a UE connection (e.g., between minimum and maximum threshold levels, less than a threshold level, etc.). Once in equilibrium, a given UE may continue to move across RUs within the same shared cell without performing any handovers. New UE connections may be established following similar techniques in order to maintain a balanced load across multiple shared cells.

An inter-DU handover may be performed, at least in part, by moving signaling radio bearers (SRBs) for the UE from one DU to another DU and sending a Radio Resource Control (RRC) reconfiguration message to the UE indicating the cell with which the UE is to establish a connection. In some instances, if there are any pending DL Packet Data Convergence Protocol (PDCP) Protocol Data Units (PDUs) that are to be delivered to the UE, the CU-UP 106 may retransmit the PDCP PDUs to the new DU for further radio signal processing operations.

Further in addition initial primary and secondary connection establishment and load balancing/re-balancing across different shared cells/DUs for a given overlapping coverage area, in one instance, DU failover scenarios may also be handled by the CU-CP 104 and CU-UP 106 in accordance with techniques of the present disclosure. For example, a DU failover may be detected by the CU-CP 104, which may trigger the CU-CP 104 to move SRBs for one or more UE(s) from the failed DU to a new DU and retransmit any undelivered PDCP PDUs for the UE(s) by the CU-UP 106 via the new DU. In some instances, for a DU failover, the CU-CP 106 may establish a new primary or secondary link for a UE via another DU. For example, if the DU for the primary link for a UE fails and the UEs traffic is moved to the secondary link/DU, then the CU-CP 106 may select and establish a new secondary shared cell/DU to which the UE can connect using the load balancing techniques discussed herein.

Figure 2A:
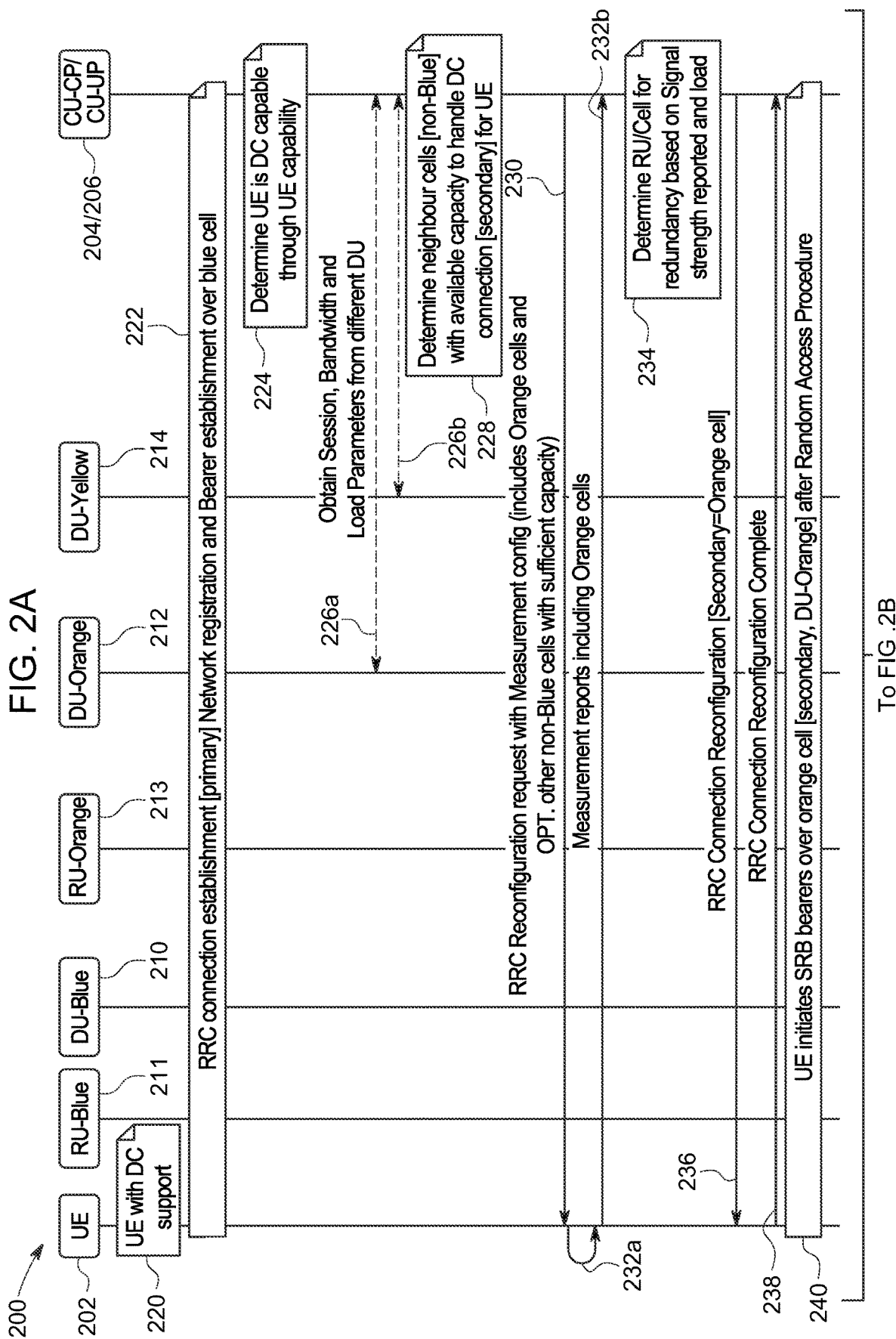
FIGS. 2A, 2B, and 2C are a message sequence diagram illustrating a call flow associated with preventing and/or minimizing UE service disruptions in a vRAN architecture, according to an example embodiment.
Figure 2B:
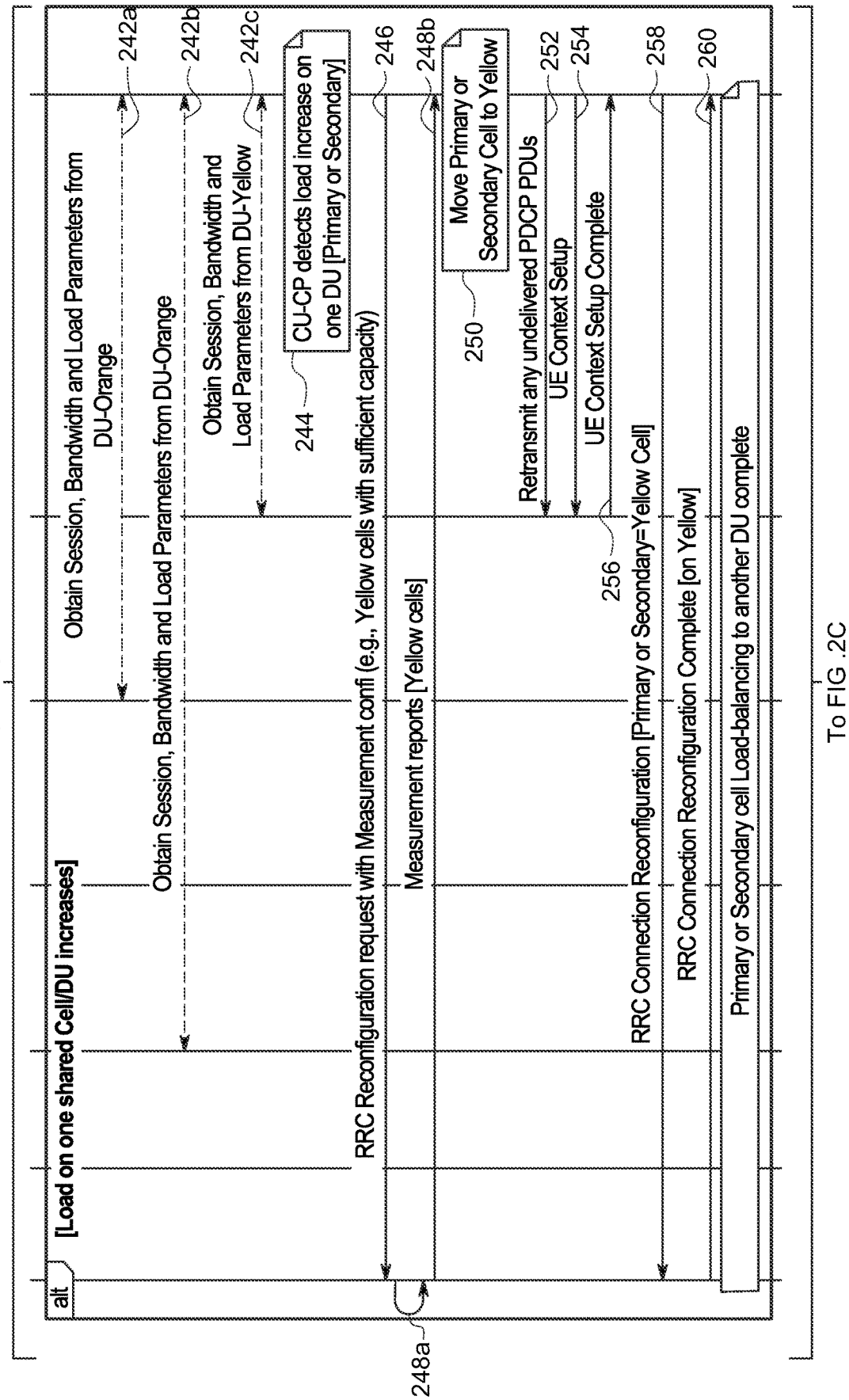
Figure 2C:
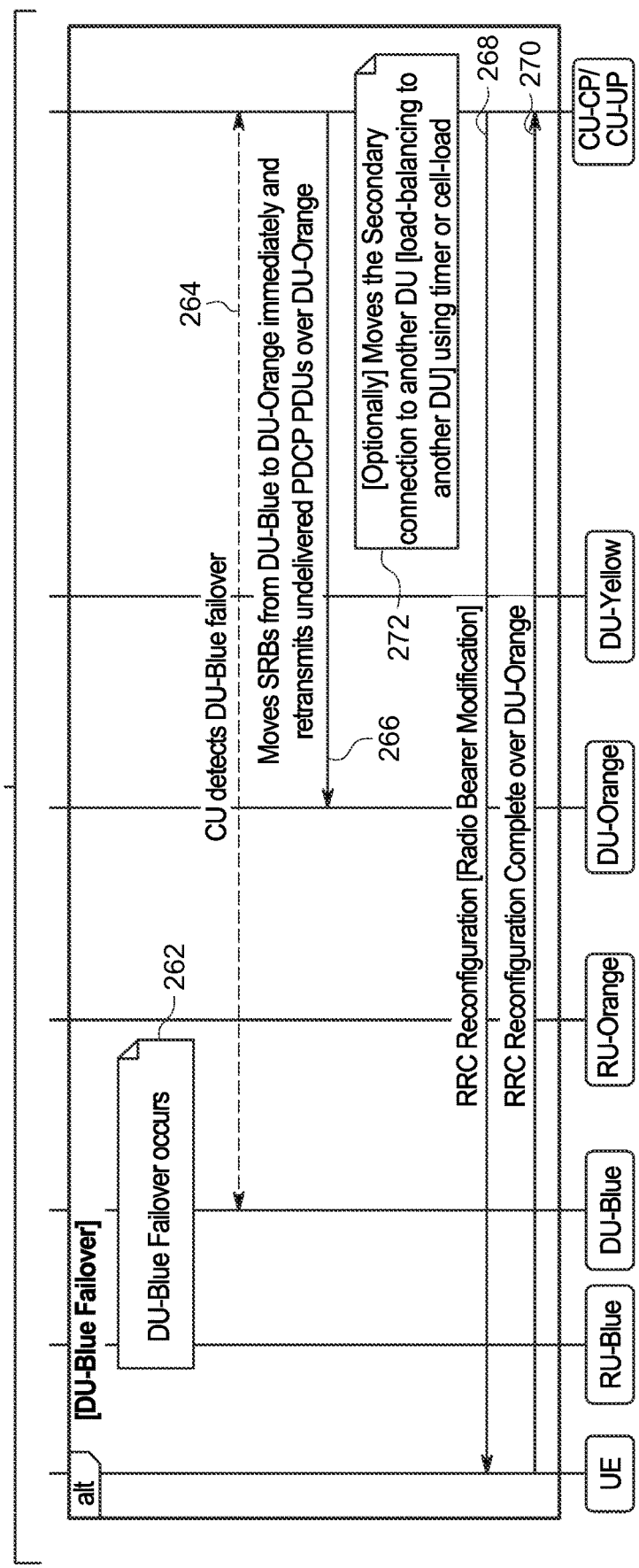

Additional operations details are discussed with reference to FIGS. 2A, 2B, and 2C, discussed below, in which FIGS. 2A, 2B, and 2C are a message sequence diagram illustrating a call flow 200 associated with preventing and/or minimizing UE service disruptions in a vRAN architecture, according to an example embodiment. FIGS. 2A, 2B, and 2C include a DC capable UE 202, a CU-CP 204 and CU-UP 206, and a number of shared cells (including corresponding RUs and DUs) within an overlapping coverage area in which the shared cells are identified using various color descriptors including 'Blue', 'Orange', and 'Yellow'. For example, a first shared cell may be served by a Blue DU (DU-Blue) 210 and two or more Blue RUs/cells (RU-Blue) 211. A second shared cell may be served by an Orange DU (DU-Orange) 212 and two or more Orange RUs/cells (RU-Orange) 213. A third shared cell may be served by a Yellow DU (DU-Yellow) 214 and two or more Yellow RUs (which are not shown in FIGS. 2A, 2B, and 2C for purposes of brevity only).

As shown at 220, consider that UE 202 is configured as a DC capable UE. At 222, RRC connection establishment, network registration, and bearer establishment are performed between UE 202 and CU-CP 204 for determining a primary or master anchor shared cell connection for UE 202 (e.g., based on load related parameters, cellular signal strengths, etc.). For the example of FIGS. 2A, 2B, and 2C, consider that CU-CP 204 performs connection/attachment of UE 202 over a Blue RU/cell, RU-Blue 211. The operations at 222 may be triggered via an initial RRC request and may include an exchange of capabilities between UE 202 and CU-CP 204 in which UE 202 indicates that it is a DC capable UE (e.g., via a flag, bit, byte, information element (IE), and/or the like communicated to CU-CP 204), which enables CU-CP 204 to determine that UE 202 is a DC capable UE, as shown at 224, for triggering secondary connection establishment for UE 202.

For establishing the secondary connection, the CU-CP 204 obtains capacity information (e.g., session information, bandwidth information (e.g., such as available and used bandwidth), load information, etc.) from other shared cells/DUs for the overlapping coverage area, as shown at 226a for the Orange shared cell/DU-Orange 212 and at 226b for the Yellow shared cell/DU-Yellow 214. In various embodiments, obtaining capacity information by a CU-CP from a DU may include any combination of pull (e.g., query by the CU-CP/response by a DU) and/or pull (e.g., periodic status updates from a DU to the CU/CP) mechanisms.

At 228, the CU-CP 204 determines based on the capacity information whether there are any of the neighbor, non-Blue cells with available capacity to handle the secondary DC connection for UE 202. Consider for the present example that CU-CP 204 determines that one or more Orange RUs/cells (RU-Orange 213) for the Orange shared cell have available capacity for the secondary connection for UE 202. Based on the determination, CU-CP 204 instructs the UE 202 to perform measurements on RUs/cells belonging to other shared cell(s) for the overlapping coverage area that have sufficient/available capacity to handle the connection/traffic for the UE 202.

For example, the CU-CP 204 can communicate an RRC Reconfiguration request to UE 202, as shown at 230, which includes measurement configuration information identifying the Orange RUs/cells for the Orange shared cell for which UE 202 is to perform signal strength measurements. In at least one embodiment, the information identifying the Orange RUs/cells may be neighbor cell descriptors such as cell identifiers (IDs) including, but not limited to, Physical Cell Identifiers (PCIs), E-UTRAN Cell Global Identifiers (ECGIs), New Radio Cell Global Identifiers (NCGIs), and/or the like. The CU-CP 204 may optionally identify any other non-Blue RUs/cells (e.g., Yellow RUs, etc.) with sufficient capacity for which the UE 202 is to perform signal strength measurements.

At 232*a*, consider that UE 202 performs signal strength measurements for the Orange RUs/cells (RU-Orange 213) (and/or any other cells as may have been identified) and sends measurement reports including measurement information such as measured signal strength for the Orange RUs/cells (and/or any other cells as may have been identified) to CU-CP 204 at 232*b*. In one embodiment, measurement information for a given RU/cell may be a Channel Quality Indicator (CQI) for the RU/cell.

At 234, the CU-CP 204 determines a best RU/cell for another (non-Blue) shared cell for which to provide redundancy for the UE 202 based on the measurement information (e.g., signal strength) reported by the UE 202 and one or a combination of the RU/cell load and/or shared cell/DU load. For the present example, the CU-CP 204 may determine an Orange RU/cell having a highest signal strength as measured by the UE 202 and enough capacity to handle the secondary connection for UE 202 and communicates an RRC Connection Reconfiguration message to the UE 202, as shown at 236, that includes a secondary cell descriptor (e.g., Secondary=Orange cell ID) to establish the secondary link for SRBs for the UE 202. At 238, the UE 202 responds with an RRC Connection Reconfiguration Complete message and, at 240, initiates SRBs over the Orange RU/cell (served by DU-Orange 212) following standards-based Random Access Procedure operations to establish the second connection.

Thus, as shown in FIG. 2A, techniques herein provide for the ability to distribute incoming UE connections across different shared cells for a given coverage area, which enable a dual connectivity UE to establish a secondary connection over a different shared cell/DU compared to the primary connection associated with the master anchor shared cell/DU for a shared cell deployment.

FIG. 2B illustrates example load balancing/re-balancing operations that may be performed in some embodiments. For example, as a load on one shared cell/DU increases for either a primary or a secondary connection for the UE 202, the CU-CP 204 may dynamically move either connection to another shared cell/DU.

Consider, as shown at 242*a*, 242*b*, and 242*c*, that the CU-CP 204 obtains capacity information or parameters (e.g., session, bandwidth, and load parameters) from each of the DU-Orange 212 (at 242*a*), the DU-Blue (at 242*b*), and the DU-Yellow (at 243*b*). Based on the obtained information, consider that the CU-CP 204 detects a load increase on one of the DUs for either the primary or the secondary connection, as shown at 244.

Upon detecting the load increase, the CU-CP 204 instructs the UE 202 to perform measurements on RUs/cells belonging to another shared cell for the overlapping coverage area that have sufficient/available capacity to handle a connection/traffic for the UE 202. For example, as shown at 246, via an RRC Reconfiguration Request including measurement configuration information identifying the other cells for which the UE 202 is to perform measurements. For the present example, consider that the message identifies Yellow RUs/cells with sufficient capacity that the UE 202 is to measure.

At 248*a*, consider that UE 202 performs signal strength measurements for the Yellow RUs/cells and sends measurement reports including measurement information such as measured signal strength for the Yellow RUs/cells to CU-CP 204 at 248*b*. For the present example, consider that the CU-CP 204 determines a Yellow RU/cell having a highest signal strength as measured by the UE 202 and enough capacity to handle the connection for UE 202 and begins to move the primary or the secondary connection for the UE 202, as shown at 250.

In one embodiment, if there are any undeliverable PDCP PDUs for the UE 202 for the connection that is to be moved, the CU-CP 204 may instruct the CU-UP 206 to retransmit any undeliverable PDCP PDUs for the UE 202 over the DU-Yellow 214, as shown at 252.

At 254, the CU-CP 204 performs a context setup for UE 202 via the DU-Yellow 214 to which the DU-Yellow 214 responds with a UE context setup complete once the setup is completed, as shown at 256. The CU-CP communicates an RRC Connection Reconfiguration message to the UE 202, as shown at 258, that includes a primary or a secondary cell descriptor (e.g., Primary or Secondary=Yellow cell ID) to switch the SRBs for the UE 202 to the Yellow cell served by DU-Yellow 214. At 260, the UE 202 responds with an RRC Connection Reconfiguration Complete message indicating completion of the SRB switch to the Yellow cell served by DU-Yellow 214, which completes the primary or secondary cell load-balancing to another (different) DU for the techniques illustrated in FIG. 2B.

The operations as illustrated in FIG. 2B may be performed iteratively in a periodic manner (e.g., based on a timer), as loading changes, etc. in order to balance or re-balance loading for multiple shared cells for a given shared cell deployment. Thus, as shown in FIG. 2B, techniques herein may provide for the ability to dynamically move either a primary or a secondary connection for a UE to another shared cell/DU to provide load balancing for a shared cell deployment. Such techniques may also provide for the ability to retransmit undelivered PDCP PDUs for the UE to the new DU.

FIG. 2C illustrates example DU failover operations that may be performed in some embodiments. Consider that the example of FIG. 2C flows from the operations discussed in FIG. 2A in which the primary connection for UE 202 is established via the Blue shared cell/DU-Blue 210 and the secondary connection for UE 202 is established via the Orange shared cell/DU-Orange 212.

For the present example, further consider that DU-Blue 210 fails, as shown at 262, and the CU-CP 204 detects the failover, as shown at 264. In one embodiment, if the CU-CP detects an F1 Application Protocol (F1-AP) communication failure, it can be considered a DU failure. At 266, the CU-CP 204 immediately moves the UE 202 SRBs from DU-Blue 210 to the secondary connection for DU-Orange 212 and instructs the CU-UP 206 to retransmit any undelivered PDCP PDUs for UE 202 to DU-Orange 212 for further processing. At 268, the CU-CP 204 communicates an RRC Reconfiguration message to UE 202 that indicates a Radio Bearer Modification for the switch of the SRBs to RU-Orange 213/DU-Orange 212 to which UE 202 responds with an RRC Configuration Complete message at 270 indicating completion of the bearer modification over RE-Orange 213/DU-Orange 212. In some embodiments, as shown at 272, the CU-CP 204 may optionally move the secondary connection to another shared cell/DU (e.g., load balancing to another DU) using a timer, cell load information, etc.

Thus, as shown in FIG. 2C, techniques herein may provide for the ability to, upon detecting the failure of a given DU, seamlessly transition bearers for the failed DU to another DU without impacting traffic for a UE or involving notifications to the mobile core network 108. Such techniques may also provide for the ability to retransmit undelivered PDCP PDUs for the UE to the new DU.

Figure 3:
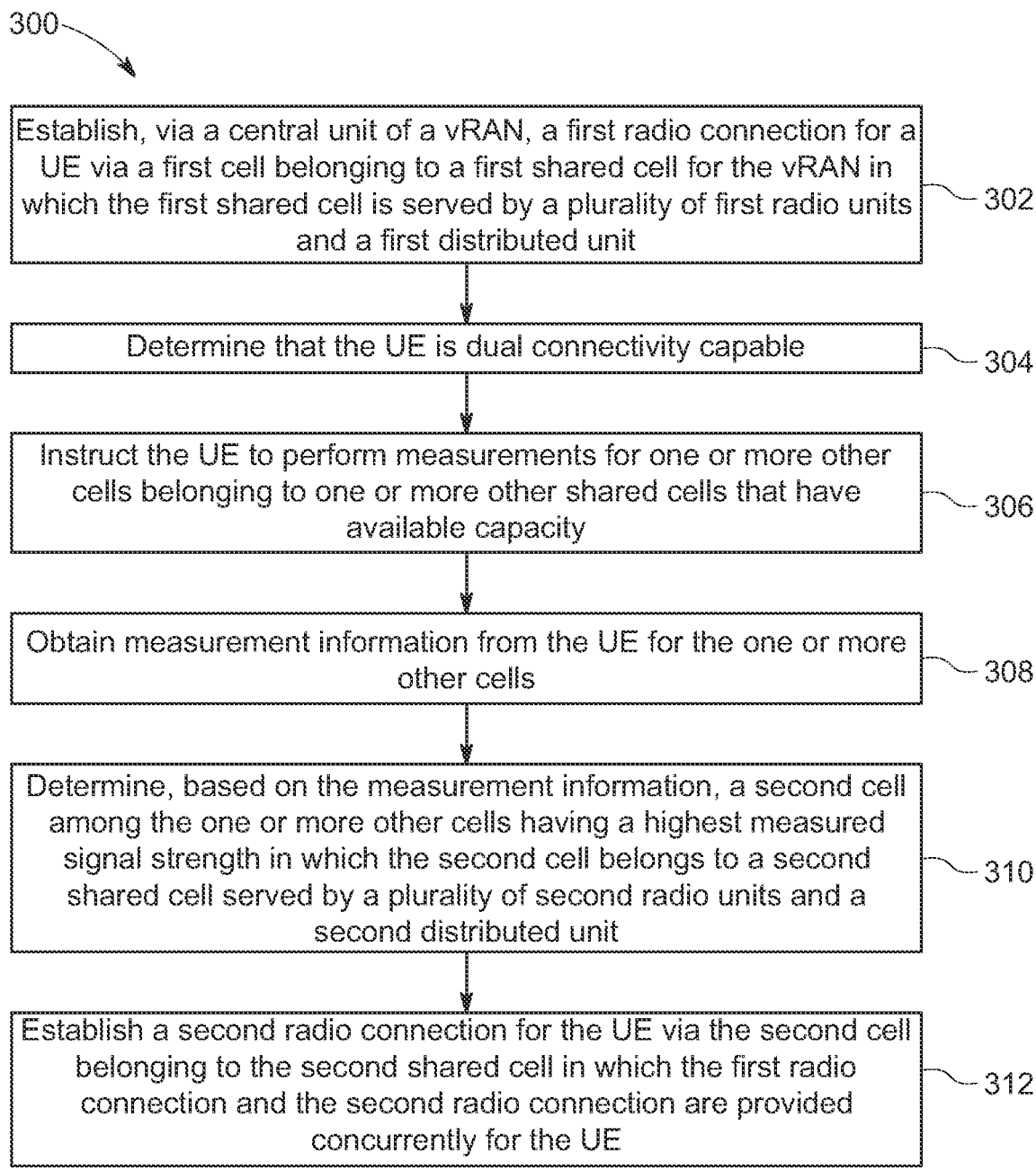
FIG. 3 is a flow chart depicting a method according to an example embodiment.

Referring to FIG. 3, FIG. 3 is a flow chart depicting a method 300 according to an example embodiment. In at least one embodiment, method 300 illustrates example operations that may be performed, at least in part, by a CU-CP/CU-UP (e.g., CU-CP 104/204 and CU-UP 106/206), in order to prevent and/or minimize UE service disruptions in a vRAN architecture, according to an example embodiment.

Consider, at 302 that the method may include establishing, via a central unit (e.g., CU-CP) of a vRAN, a first radio connection for a UE via a first cell belonging to a first shared cell for the vRAN in which the first shared cell is served by a plurality of first radio units and a first distributed unit. The first radio units may each provide respective first cells that define the first shared cell.

At 304, the method may include the central unit determining that the UE is dual connectivity capable. At 306, based on determining that the UE is dual connectivity capable, the method may include the central unit instructing the UE to perform measurements for one or more other cells belonging to one or more other shared cells that have available capacity. The central unit may determine one or more other shared cells that have available capacity based on capacity information obtained from DUs for each of the other shared cells.

At 308, the method may include the central unit obtaining measurement information from the UE for the one or more other cells. At 310, the method may include the central unit determining, based on the measurement information, a second cell among the one or more other cells having a highest measured signal strength in which the second cell belongs to a second shared cell served by a plurality of second radio units and a second distributed unit that is different than the first distributed unit. The second radio units may each provide respective second cells that define the second shared cell.

At 312, the method may include establishing, by the central unit, a second radio connection for the UE via the second cell belonging to the second shared cell in which the first radio connection and the second radio connection are provided concurrently for the UE.

Other operations may be performed in accordance with techniques herein. For example, in one instance the method may include determining that one of the first shared cell and the second shared cell is overloaded; instructing the UE to perform additional measurements for one or more additional cells belonging to one or more additional shared cells that have available capacity; obtaining additional measurement information from the UE for the one or more additional cells; determining, based on the additional measurement information, a third cell among the one or more additional shared cells having a highest measured signal strength, wherein the third cell belongs to a third shared cell for the vRAN; and moving one of the first radio connection or the second radio connection for the UE to a third radio connection for the UE via the third cell. The moving may include moving SRBs for the UE.

In another instance, the method may include determining a failure of a first distributed unit for the first shared cell; moving first signal radio bearers for the first radio connection for the UE to a second distributed unit for the second shared cell; and transmitting one or more undelivered PDCP PDUs for the UE via the second radio connection for the UE.

Figure 4:
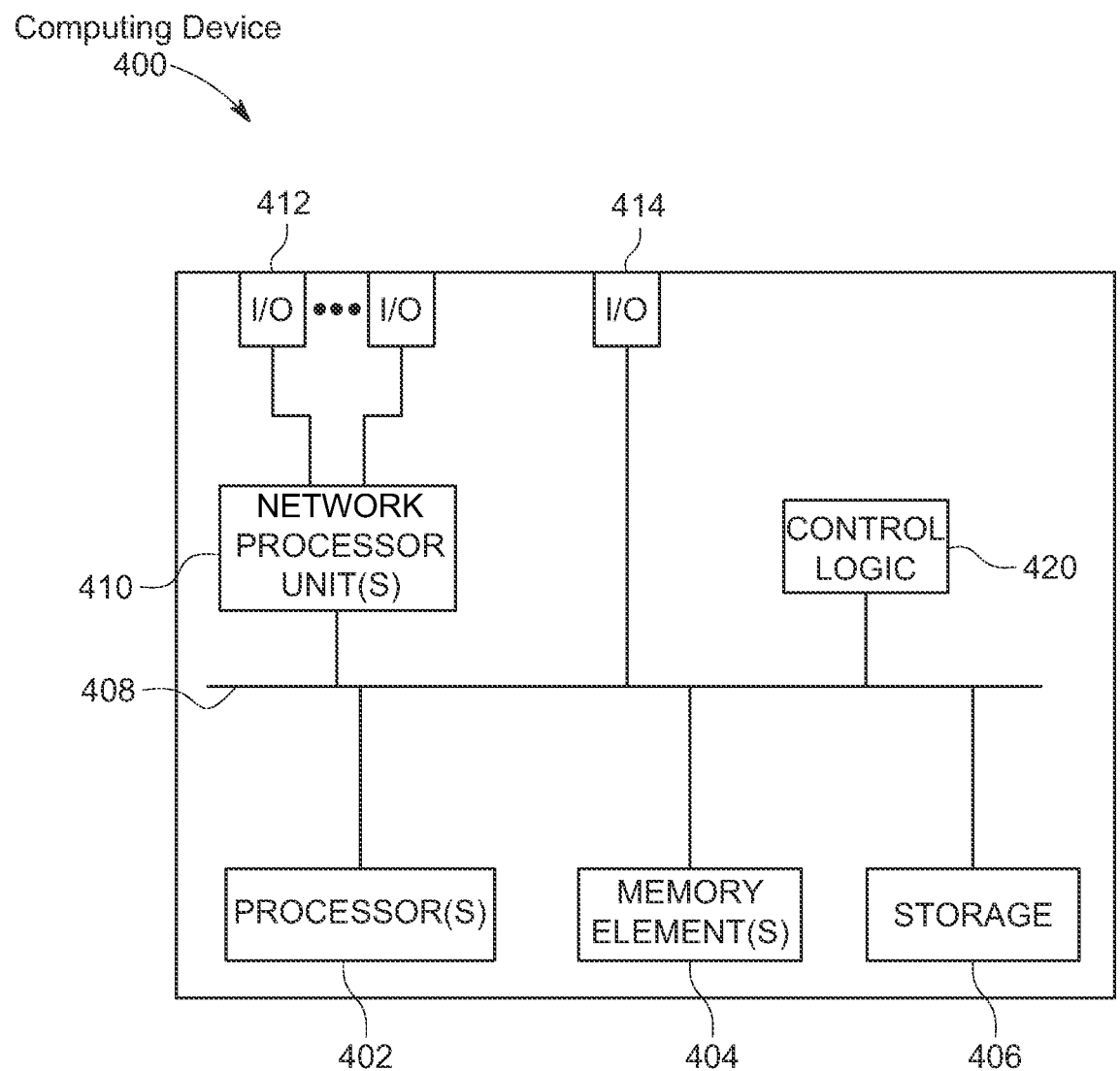
FIG. 4 is a hardware block diagram of a computing device that may perform functions associated with any combination of operations, in connection with the techniques depicted in FIGS. 1-3.

Referring to FIG. 4, FIG. 4 illustrates a hardware block diagram of a computing device 400 that may perform functions associated with operations discussed herein in connection with the techniques depicted in FIGS. 1-3. In various embodiments, a computing device, such as computing device 400 or any combination of computing devices 400, may be configured as any entity/entities as discussed for the techniques depicted in connection with FIGS. 1-3 in order to perform operations of the various techniques discussed herein, such as, for example CU-CP 104/204 and CU/UP 106/206.

In at least one embodiment, computing device 400 may include one or more processor(s) 402, one or more memory element(s) 404, storage 406, a bus 408, one or more network processor unit(s) 410 interconnected with one or more network input/output (I/O) interface(s) 412, one or more I/O interface(s) 414, and control logic 420. In various embodiments, instructions associated with logic for computing device 400 can overlap in any manner and are not limited to the specific allocation of instructions and/or operations described herein.

In at least one embodiment, processor(s) 402 is/are at least one hardware processor configured to execute various tasks, operations and/or functions for computing device 400 as described herein according to software and/or instructions configured for computing device. Processor(s) 402 (e.g., hardware processor(s)) can execute any type of instructions associated with data to achieve the operations detailed herein. In one example, processor(s) 402 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 404 and/or storage 406 is/are configured to store data, information, software, and/or instructions associated with computing device 400, and/or logic configured for memory element(s) 404 and/or storage 406. For example, any logic described herein (e.g., control logic 420) can, in various embodiments, be stored for computing device 400 using any combination of memory element(s) 404 and/or storage 406. Note that in some embodiments, storage 406 can be consolidated with memory element(s) 404 (or vice versa), or can overlap/exist in any other suitable manner.

In at least one embodiment, bus 408 can be configured as an interface that enables one or more elements of computing device 400 to communicate in order to exchange information and/or data. Bus 408 can be implemented with any architecture designed for passing control, data and/or information between processors, memory elements/storage, peripheral devices, and/or any other hardware and/or software components that may be configured for computing device 400. In at least one embodiment, bus 408 may be implemented as a fast kernel-hosted interconnect, potentially using shared memory between processes (e.g., logic), which can enable efficient communication paths between the processes.

In various embodiments, network processor unit(s) 410 may enable communication between computing device 400 and other systems, entities, etc., via network I/O interface(s) 412 to facilitate operations discussed for various embodiments described herein. In various embodiments, network processor unit(s) 410 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 400 and other systems, entities, etc. to facilitate operations for various embodiments described herein. In various embodiments, network I/O interface(s) 412 can be configured as one or more Ethernet port(s), Fibre Channel ports, and/or any other I/O port(s) now known or hereafter developed. Thus, the network processor unit(s) 410 and/or network I/O interface(s) 412 may include suitable interfaces for receiving, transmitting, and/or otherwise communicating data and/or information in a network environment.

I/O interface(s) 414 allow for input and output of data and/or information with other entities that may be connected to computer device 400. For example, I/O interface(s) 414 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 420 can include instructions that, when executed, cause processor(s) 402 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

For example, in at least one implementation, control logic 420 can include instructions that, when executed, cause processor(s) 402 to perform operations including establishing a first radio connection for a UE via a first cell belonging to a first shared cell for the vRAN, wherein the first shared cell is served by a plurality of first radio units and a first distributed unit; determining that the UE is dual connectivity capable; instructing the UE to perform measurements for one or more other cells belonging to one or more other shared cells that have available capacity; obtaining measurement information from the UE for the one or more other cells; determining, based on the measurement information, a second cell among the one or more other cells having a highest measured signal strength, wherein the second cell belongs to a second shared cell served by a plurality of second radio units and a second distributed unit; and establishing a second radio connection for the UE via the second cell belonging to the second shared cell, wherein the first radio connection and the second radio connection are provided concurrently for the UE.

The programs described herein (e.g., control logic 420) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, and register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 404 and/or storage 406 can store data, software, code, instructions (e.g., processor instructions), logic, parameters, combinations thereof, and/or the like used for operations described herein. This includes memory element(s) 404 and/or storage 406 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

For embodiments in which computing device 400 may be configured as a UE or an RU, the computing device may additionally include any combination of hardware (e.g., communications units, receiver(s), transmitter(s), transceiver(s), antenna(s) and/or antenna array(s), processor(s), memory element(s), baseband processor(s) (modems), etc.)], controllers, software, logic, and/or any other elements/entities that may facilitate over-the-air RF connections.

In one form, a computer-implemented method is provided that may include establishing, via a central unit of a virtualized Radio Access Network (vRAN), a first radio connection for a user equipment (UE) via a first cell belonging to a first shared cell for the vRAN, wherein the first shared cell is served by a plurality of first radio units and a first distributed unit; determining that the UE is dual connectivity capable; instructing the UE to perform measurements for one or more other cells belonging to one or more other shared cells that have available capacity; obtaining measurement information from the UE for the one or more other cells; determining, based on the measurement information, a second cell among the one or more other cells having a highest measured signal strength, wherein the second cell belongs to a second shared cell served by a plurality of second radio units and a second distributed unit that is different than the first distributed unit; and establishing a second radio connection for the UE via the second cell belonging to the second shared cell, wherein the first radio connection and the second radio connection are provided concurrently for the UE.

For the method, the plurality of first radio units are interconnected with a first distributed unit of the vRAN, the plurality of second radio units are interconnected with a second distributed unit of the vRAN, and the first distributed unit and the second distributed unit are interconnected with the central unit of the vRAN.

The method may further include determining the one or more other cells that have available capacity based on capacity information obtained from the one or more other shared cells. The capacity information may include at least one of load information, session information, and bandwidth information for the one or more other shared cells. The capacity information may be obtained from a distributed unit for each of the one or more other shared cells.

In some instances, the method may further include determining that one of the first shared cell and the second shared cell is overloaded; instructing the UE to perform additional measurements for one or more additional cells belonging to one or more additional shared cells that have available capacity; obtaining additional measurement information from the UE for the one or more additional cells; determining, based on the additional measurement information, a third cell among the one or more additional shared cells having a highest measured signal strength, wherein the third cell belongs to a third shared cell for the vRAN; and moving one of the first radio connection or the second radio connection for the UE to a third radio connection for the UE via the third cell, which is served by a third distributed unit that is different than the first or the second distributed unit. In some instances, the method may further include transmitting one or more undelivered Packet Data Convergence Protocol (PDCP) Protocol Data Units (PDUs) for the UE via the third radio connection for the UE.

In some instances, the method may further include determining a failure of a first distributed unit for the first shared cell; moving first signal radio bearers for the first radio connection for the UE to a second distributed unit for the second shared cell; and transmitting one or more undelivered Packet Data Convergence Protocol (PDCP) Protocol Data Units (PDUs) for the UE via the second radio connection for the UE.

In summary, techniques herein may provide for any combination of distributing incoming UE connections across multiple different shared cells to distribute loading for a shared cell deployment; enabling a dual connectivity (DC) capable UE to establish a secondary connection over a different DU compared to the primary connection in a shared cell deployment; dynamically moving either the primary or the secondary connection for a DC capable UE to another DU based on DU/cell load information; upon a DU failure, detecting the failure and seamless transitioning bearers for the failed DU to another DU without impacting traffic or notifications to a mobile core network; and/or providing undelivered PDCP PDUs via another DU for DC clients (e.g., upon DU failure and/or upon load balancing connections for a UE).

VARIATIONS AND IMPLEMENTATIONS

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fib®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, entities for various embodiments described herein can encompass network elements (which can include virtualized network elements, functions, etc.) such as, for example, network appliances, forwarders, routers, servers, switches, gateways, bridges, load balancers, firewalls, processors, modules, radio receivers/transmitters, and/or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
    establishing, via a central unit of a virtualized Radio Access Network (vRAN), a first radio connection for a user equipment (UE) via a first cell belonging to a first shared cell for the vRAN, wherein the first shared cell is served by a plurality of first radio units and a first distributed unit;
    determining that the UE is dual connectivity capable;
    instructing the UE to perform measurements for one or more other cells belonging to one or more other shared cells that have available capacity;
    obtaining measurement information from the UE for the one or more other cells;
    determining, based on the measurement information, a second cell among the one or more other cells having a highest measured signal strength, wherein the second cell belongs to a second shared cell served by a plurality of second radio units and a second distributed unit; and
    establishing a second radio connection for the UE via the second cell belonging to the second shared cell, wherein the first radio connection and the second radio connection are provided concurrently for the UE.

2. The method of claim 1, further comprising:
    determining the one or more other cells that have available capacity based on capacity information obtained from the one or more other shared cells.

3. The method of claim 2, wherein the capacity information includes at least one of: load information, session information, and bandwidth information for the one or more other shared cells.

4. The method of claim 2, wherein the capacity information is obtained from a distributed unit for each of the one or more other shared cells.

5. The method of claim 1, further comprising:
    determining that one of the first shared cell and the second shared cell is overloaded;
    instructing the UE to perform additional measurements for one or more additional cells belonging to one or more additional shared cells that have available capacity;
    obtaining additional measurement information from the UE for the one or more additional cells;
    determining, based on the additional measurement information, a third cell among the one or more additional shared cells having a highest measured signal strength, wherein the third cell belongs to a third shared cell for the vRAN; and moving one of the first radio connection or the second radio connection for the UE to a third radio connection for the UE via the third cell, which is served by a third distributed unit that is different than the first or the second distributed unit.

6. The method of claim 5, further comprising:
transmitting one or more undelivered Packet Data Convergence Protocol (PDCP) Protocol Data Units (PDUs) for the UE via the third radio connection for the UE.

7. The method of claim 1, further comprising:
determining a failure of a first distributed unit for the first shared cell;
moving first signal radio bearers for the first radio connection for the UE to a second distributed unit for the second shared cell; and
transmitting one or more undelivered Packet Data Convergence Protocol (PDCP) Protocol Data Units (PDUs) for the UE via the second radio connection for the UE.

8. One or more non-transitory computer readable storage media encoded with instructions that, when executed by a processor, cause the processor to perform operations, comprising:
establishing, via a central unit of a virtualized Radio Access Network (vRAN), a first radio connection for a user equipment (UE) via a first cell belonging to a first shared cell for the vRAN, wherein the first shared cell is served by a plurality of first radio units and a first distributed unit;
determining that the UE is dual connectivity capable;
instructing the UE to perform measurements for one or more other cells belonging to one or more other shared cells that have available capacity;
obtaining measurement information from the UE for the one or more other cells;
determining, based on the measurement information, a second cell among the one or more other cells having a highest measured signal strength, wherein the second cell belongs to a second shared cell served by a plurality of second radio units and a second distributed unit; and
establishing a second radio connection for the UE via the second cell belonging to the second shared cell, wherein the first radio connection and the second radio connection are provided concurrently for the UE.

9. The media of claim 8, further comprising instructions that, when executed by the processor, cause the processor to perform further operations, comprising:
determining the one or more other cells that have available capacity based on capacity information obtained from the one or more other shared cells.

10. The media of claim 9, wherein the capacity information includes at least one of: load information, session information, and bandwidth information for the one or more other shared cells and wherein the capacity information is obtained from a distributed unit for each of the one or more other shared cells.

11. The media of claim 8, further comprising instructions that, when executed by the processor, cause the processor to perform further operations, comprising:
determining that one of the first shared cell and the second shared cell is overloaded;
instructing the UE to perform additional measurements for one or more additional cells belonging to one or more additional shared cells that have available capacity;
obtaining additional measurement information from the UE for the one or more additional cells;
determining, based on the additional measurement information, a third cell among the one or more additional shared cells having a highest measured signal strength, wherein the third cell belongs to a third shared cell for the vRAN; and
moving one of the first radio connection or the second radio connection for the UE to a third radio connection for the UE via the third cell, which is served by a third distributed unit that is different than the first or the second distributed unit.

12. The media of claim 8, further comprising instructions that, when executed by the processor, cause the processor to perform further operations, comprising:
determining a failure of a first distributed unit for the first shared cell;
moving first signal radio bearers for the first radio connection for the UE to a second distributed unit for the second shared cell; and
transmitting one or more undelivered Packet Data Convergence Protocol (PDCP) Protocol Data Units (PDUs) for the UE via the second radio connection for the UE.

13. A system comprising:
at least one memory element for storing data; and
at least one processor for executing instructions associated with the data, wherein executing the instructions causes the system to perform operations, comprising:
establishing, via a central unit of a virtualized Radio Access Network (vRAN), a first radio connection for a user equipment (UE) via a first cell belonging to a first shared cell for the vRAN, wherein the first shared cell is served by a plurality of first radio units and a first distributed unit;
determining that the UE is dual connectivity capable;
instructing the UE to perform measurements for one or more other cells belonging to one or more other shared cells that have available capacity;
obtaining measurement information from the UE for the one or more other cells;
determining, based on the measurement information, a second cell among the one or more other cells having a highest measured signal strength, wherein the second cell belongs to a second shared cell served by a plurality of second radio units and a second distributed unit; and
establishing a second radio connection for the UE via the second cell belonging to the second shared cell, wherein the first radio connection and the second radio connection are provided concurrently for the UE.

14. The system of claim 13, wherein the plurality of first radio units are interconnected with a first distributed unit of the vRAN, the plurality of second radio units are interconnected with a second distributed unit of the vRAN, and the first distributed unit and the second distributed unit are interconnected with the central unit of the vRAN.

15. The system of claim 13, wherein executing the instructions causes the system to perform further operations, comprising:
determining the one or more other cells that have available capacity based on capacity information obtained from the one or more other shared cells.

16. The system of claim 15, wherein the capacity information includes at least one of: load information, session information, and bandwidth information for the one or more other shared cells.

17. The system of claim 15, wherein the capacity information is obtained from a distributed unit for each of the one or more other shared cells.

18. The system of claim 13, wherein executing the instructions causes the system to perform operations, comprising:
- determining that one of the first shared cell and the second shared cell is overloaded;
- instructing the UE to perform additional measurements for one or more additional cells belonging to one or more additional shared cells that have available capacity;
- obtaining additional measurement information from the UE for the one or more additional cells;
- determining, based on the additional measurement information, a third cell among the one or more additional shared cells having a highest measured signal strength, wherein the third cell belongs to a third shared cell for the vRAN; and
- moving one of the first radio connection or the second radio connection for the UE to a third radio connection for the UE via the third cell, which is served by a third distributed unit that is different than the first or the second distributed unit.

19. The system of claim 18, wherein executing the instructions causes the system to perform operations, comprising:
- transmitting one or more undelivered Packet Data Convergence Protocol (PDCP) Protocol Data Units (PDUs) for the UE via the third radio connection for the UE.

20. The system of claim 13, wherein executing the instructions causes the system to perform operations, comprising:
- determining a failure of a first distributed unit for the first shared cell;
- moving first signal radio bearers for the first radio connection for the UE to a second distributed unit for the second shared cell; and
- transmitting one or more undelivered Packet Data Convergence Protocol (PDCP) Protocol Data Units (PDUs) for the UE via the second radio connection for the UE.

* * * * *